United States Patent [19]

Ikenoue

[11] Patent Number: 5,382,508
[45] Date of Patent: Jan. 17, 1995

[54] PHOTOGRAPHIC-FILM PRODUCT

[75] Inventor: Shinpei Ikenoue, Minami-Ashigara, Japan

[73] Assignee: Fuji Photo Film Co., Ltd., Kanagawa, Japan

[21] Appl. No.: 65,025

[22] Filed: May 24, 1993

Related U.S. Application Data

[63] Continuation of Ser. No. 845,013, Mar. 3, 1992, abandoned.

[30] Foreign Application Priority Data

| Mar. 8, 1991 | [JP] | Japan | 3-012987[U] |
| May 17, 1991 | [JP] | Japan | 3-113420 |
| May 17, 1991 | [JP] | Japan | 3-113421 |
| Jul. 5, 1991 | [JP] | Japan | 3-051993[U] |

[51] Int. Cl.$^6$ ............................ G03C 3/00; G03B 17/24
[52] U.S. Cl. ............................ 430/496; 430/501; 354/105; 354/106; 354/109; 354/159
[58] Field of Search ............... 354/105, 106, 107, 109, 354/159, 215; 430/496, 501

[56] References Cited

U.S. PATENT DOCUMENTS

| 4,370,409 | 1/1983 | Bostroem | 430/501 |
| 4,583,831 | 4/1986 | Harvey . | |
| 4,588,665 | 5/1986 | Drexler | 430/496 |
| 4,862,201 | 8/1989 | Taniguchi et al. | 354/105 |
| 4,965,627 | 10/1990 | Robison | 430/496 |
| 4,973,997 | 11/1990 | Harvey | 354/106 |
| 5,128,711 | 7/1992 | Terashita et al. | 354/106 |

FOREIGN PATENT DOCUMENTS

| 2622707 | 10/1987 | France . | |
| 1-279243 | 11/1989 | Japan | 430/501 |
| WO84/02201 | 6/1984 | WIPO . | |

Primary Examiner—Charles L. Bowers, Jr.
Assistant Examiner—Mark F. Huff
Attorney, Agent, or Firm—Sughrue, Mion, Zinn, Macpeak & Seas

[57] ABSTRACT

The photographic film product can provide three different aspect ratios in the range of 1.70 to 1.90, and record on the film at least three pieces of information about the aspect ratios. In addition, the photographic film product can provide larger area of optical data-recording portions at longitudinal edges of a film, with the result that various kinds of data can be input and recorded into the portions.

6 Claims, 4 Drawing Sheets

PHOTOGRAPHIC-FILM PRODUCT

This is a continuation of application Ser. No. 07/845,013 filed Mar. 3, 1992, now abandoned.

BACKGROUND OF THE INVENTION

The present invention relates to a photographic-film product, and in particular, such a product including a roll of film having a data-recording portion provided outside image-areas in the direction of the film's width.

RELATED ART STATEMENT

U.S. Pat. No. 4,357,102 discloses a method of printing panoramic photographs. Japanese Patent Public Disclosure No. 1-282,533 discloses a printer capable of printing panoramic photographs as well as non-panoramic photographs. However, both of them merely disclose how to make prints having two different aspect ratios at most within one film and do not even disclose preferred aspect ratios.

The present photograph printing system can provide photographs having one of two different aspect ratios: panoramic photographs having aspect ratio 2.85 and non-panoramic photographs having aspect ratio 1.48. However, this system provides us with a narrow range of choices in aspect ratios, only two choices as aforementioned. In addition, this system cannot provide different aspect ratios within one film.

If a solution to these problems is attempted with the present photograph printing system unchanged, another problem will arise in that the efficiency of making prints will deteriorate. On the other hand, if a mask means is provided with an exposure aperture of a camera so as to change image-area sizes in accordance with aspect ratios, it would be difficult to make a compact camera, and to avoid manufacturing costs from rising. If a mask means were not provided in order to avoid these problems, and aspect ratios were adjusted when making prints, another problem would arise in that all images held in image-areas would not be transfered to prints.

Furthermore, there is room for improving image quality of panoramic prints, but the aforementioned U.S. Patent and other related patents cannot be helpful in this regard.

Conventionally, 110-format film and 126-format film have indications formed along the periphery of image-areas, for indicating the location of image-areas, in order to determine the locations and/or sizes of image-areas on a film. Such indications are formed, for instance, in the shape of frames. On the other hand, to improve the image quality of photographs, optical means and the like have been used to input and record various kinds of data onto a photographic-film. Such data include photograph-data such as the presence of an electronic flash, the color termperature, LV value, the object distance, the focal length, the contrast of an object, the date and site of photographing; film-data such as the kind of photographic-film being used, the date the film was produced, the conditions required when printing; and laboratory-data such as the name of a laboratory, the date of developing, and the conditions required when developing and printing. For instance, see Japanese Patent Public Disclosures Nos. 51-117,632, 59-214,023, 64-6,933, 63-201,645, 49-74,019, 55-101,932, 54-2,115, 52-1,333, 52-30,429, 63-298,233, 64-21,432 and 50-30,517, and Japanese Utility Model Public Disclosure No. 63-188,644.

However, a photographic-film product having a roll of film having both the aforementioned indications and a data-recording portion is not still put to practical use so far. Manufacture of such a film product is highly desired.

In the conventional 110-format film and 126-format film, a picture plane has been formed larger in area than an image area to make up for the lack of accuracy in the relative positioning between an exposure aperture of a camera and a film. (As used herein, the term "a picture plane" generally describes an area of a film actually exposed to light through an exposure aperture of a camera while taking photographs with the camera and an area containing the actual image that will appear in a developed photograph, and the term "an image-area" generally describes an area of a film surrounded with the aforementioned indications such as "frame". Images can be formed within the image-area. However, it should be noted that the picture plane is not always coextensive with the image-area.) However, it is necessary to increase the width of lines forming the frames in order to overlap the frame with the image-area. For this reason, when the data-recording portion is to be formed outside the image-area in the direction of the film's width, the area of the data-recording portion tends to be insufficient, resulting in difficulty of recording the various kinds of data aforementioned.

OBJECTS AND SUMMARY OF THE INVENTION

It is an object of the present invention to provide a photographic-film product including a film provided with appropriate indications for indicating the size and location of image-areas, whereby the photographic-film product is capable of providing at least three different aspect-ratios, an improvement of the image quality of panoramic prints, and an increased area of data-recording portions without increasing the width of the film.

According to the present invention, a photographic film product comprises: a cartridge; a spool carried in the cartridge for rotation about a longitudinal axis of the spool; a film wound into a roll around the spool, the film having image-areas not smaller than 350 square millimeters but not larger than 1200 square millimeters, the film having aspect ratio in the range of 1.70 to 1.90; and recording means, provided on at least one of the film and the cartridge, for recording on the film at least three pieces of information about the aspect ratio of the image-area.

In a preferred embodiment, marks are printed on the portion outside the image-areas of the film, in advance, prior to taking photographs, to indicate opposite ends of the image-areas which sizes vary in accordance with different aspect ratios.

In another preferred embodiment, first marks are printed on the film to indicate at least a part of the periphery of the image-areas so that second marks can be printed to indicate opposite ends of the image-areas which size varies in accordance with different aspect ratios.

According to the present invention, a photographic-film product has a roll of film having indications for representing the location of image-areas. The indications extend in both lengthwise and widthwise directions of the film along the periphery of image-areas, and are made visual by developing the film. The film has data-recording portions formed thereon outside the image-areas in the direction of the film's width or at the longitudinal edges of the film. The difference, as viewed in the film's lengthwise direction, between the film's widthwise-extending indications and the length of the image-areas is larger than the difference, as viewed in the film's widthwise direction, between the film's lengthwise-extending indications and the width of the image-areas.

Considering that the larger an aspect ratio is, the larger a print is to be enlarged, an image-area is required to have an area not less than 350 square millimeters to keep the image quality of prints good. However, if an image-area is over 1200 square millimeters, a camera must be large sized. For this reason, an image-area should be within the range of 350 to 1200 square millimeters. Preferably, an image-area should be within the range of 400 to 900 square millimeters.

The inventor has found that the prints can increase its variety, if three specific aspect ratios could be provided. The three aspect ratios are as follows:
 1. Low aspect ratio: 1.40 to 1.60
 2. Intermediate aspect ratio: 1.70 to 1.90
 3. High aspect ratio: 2.00 to 3.00
Of course, the number of aspect ratios may be increased.

If an intermediate aspect ratio is adopted for prints, an enlarging ratio of panoramic prints can be decreased relative to conventional panoramic prints having a high aspect ratio, and thus the image quality of prints can be improved. For this reason, the present invention adopts the intermediate aspect ratio 1.70 to 1.90 for image-areas.

If an aspect ratio of image-areas is set close to the aspect ratio of HDTV (1.78), the hybrids of the silver-salt photographing system and the electronic imaging system are easy to make. The preferred intermediate aspect ratio is within the range of 1.75 to 1.85.

Preferred means for recording information about an aspect ratio indicated when taking photographs include: an optical means utilizing the photosensitivity of a film, a magnetic means utilizing a magnetic record layer provided on a film or a cartridge, and/or an electric means utilizing a semiconductor provided on a cartridge.

The optical data-recording portion of a film in which various kinds of data are recorded through the optical means is preferably provided outside image-areas in the direction of the film's width. This is because providing the optical data-recording portions between image-areas in the direction of the film's length results in the elongation of the whole length of the film, which is not advantageous for manufacturing, thinner camera. On the other hand, if the optical data-recording portions are provided between perforations, a quite complex camera structure is required to input data into the optical data-recording portions and read data from the same. For this reason, the optical data-recording portions are preferably not provided between image-areas or perforations, but provided outside image-areas in the direction of the film's width.

It is preferred to decrease the number of perforations in order to maintain sufficient area of the optical data-recording portions. Conventionally, a film is fed by means of perforations. To decrease the number of perforations, another film-feeding mechanism may be adopted which makes no use of perforations in feeding a film, and uses perforations only for registering a film in a camera. An image-area has preferably not more than 4 perforations, more preferably not more than 2 perforations.

A light-tight type cartridge such as is disclosed in Japanese Utility Model Application No. 1-17253 is preferably used to prevent elimination because of light leakage from occuring to data input into the optical data-recording portions by means of an optical data-recording means.

A transparent magnetic base as disclosed in U.S. Pat. Nos. 4,302,523, 3,782,947 and 4,279,945 is preferably used as a magnetic data-recording means. Magnetic data-recording layers may be formed in the shape of stripes outside image-areas in the direction of the film's width, or may be formed on a cartridge.

A semiconductor element used as an electrical means is preferably EEPROM, for instance.

One of the aforementioned three means; an optical data-recording means, a magnetic data-recording means, or an electric data-recording means may be adopted as a recording means for recording information concerning aspect ratios, or at least two of the aforementioned three means may be used in combination.

Frame-type marks are preferred as indications for indicating the location of image-areas having an aspect ratio within the range of 1.70 to 1.90. The indications in the shape of a frame-type mark extend continuously along the periphery of image-areas in the direction of the film's length, and cover all area between adjacent image-areas in the direction of the film's length. Alternatively, the indications may be provided only in an area between adjacent image-areas in the direction of the film's length without providing the indications along the periphery of image-areas in the direction of the film's length, since locating a film in a printer, while printing, can be accomplished by adjusting the location of a film in only the direction of the film's length.

The indications may be provided in any form. The most preferred form is a line. If the indications are formed in the shape of lines, then widths of the lines are preferably as narrow as possible, in order to make it easy to print marks onto a film to represent opposite ends of image-areas the size of which varies in accordance with different aspect ratios. The lines have width preferably not more than 1 millimeter, more preferably not more than 0.5 millimeters, and most preferably 0.3 millimeters, but not less than 0.05 millimeters. The narrower the width of the lines is, the smaller the amount of necessary developing solution, and the larger the area of provided optical data-recording portion. It is preferred that width of the marking lines is made narrow, and that a plurality of marks be provided between adjacent image-areas.

The lines comprising the indications for indicating the image-areas are preferably made to be broken lines or dotted lines, which makes it easier to find the image-areas and decreases the amount of necessary developing solution.

It is preferred that the lines are provided with breaks at the positions where the marks are printed to indicate opposite ends of the image-areas the size of which varies in accordance with different aspect ratios, because such lines makes it easier to find opposite ends of the image-areas.

The difference in density between the indications and photographic fog portions is preferably not less than 0.4 in at least one of red, green or blue densities, and more preferably not less than 0.6.

The indications for indicating the location of the image-areas are usually printed onto a film when the film is produced.

The marks indicating opposite ends of the image-areas the size of which varies in accordance with the aspect ratios are printed onto a film when either the film is produced or photographs are taken. The marks can have any form such as a circle, an oval, a triangle, a rectangle or a rhombus.

The length of a diameter, a diagonal line or a vertical line extending from an apex to a subtense in the marks is preferred to be within the range of 0.5 mm to 3 mm. Use of apexes of polygons is preferred to indicate opposite ends of the image-areas, since they make easier and more precise to find the opposite ends of the image-areas. Alternatively, lines such as a solid line and a dotted line may be used to indicate opposite ends of the image-areas. The width of the lines is preferred to be within the range of 0.05 mm to 0.2 mm. An arrow mark composed of a solid line or a broken line may be used. The marks for indicating opposite ends of the image-areas are printed outside the image-areas when a film is produced or photographs are taken.

The present invention provides a photographic-film package in which a roll of film has indications for representing the location of image-areas. The indications extend in both lengthwise and widthwise directions of the film along the periphery of image-areas and are made visual when the film is developed. The film has a data-recording portion formed thereon outside the image-areas in the direction of the film's width. The difference, as viewed in the film's lengthwise direction, between the film's widthwise-extending indications and the length of the image-areas is larger than the difference, as viewed in the film's widthwise direction, between the film's lengthwise-extending indications and the width of the image-areas.

Recently a guide rail for locating a film in the direction of the film's width has been provided in a camera to fixedly locate exposure apertures of the camera relative to the guide rail, so that a film is more precisely located relative to the exposure apertures of a camera in the direction of the film's width. Thus, an overlapping area between the indications and the image-areas in the direction of the film's width can be minimized.

The difference ($\Delta D_t$ hereinafter), when viewed in the film's widthwise direction, between the indications and the width of the image-area is preferably not more than 1 mm, more preferably not more than 0.8 mm, and most preferably not more than 0.6 mm. It is further preferable that the difference be not less than 0.4 mm.

The indications for representing the location of the image-areas may be formed in any shapes. In general, the indications are formed in the shape of a line: a solid line, a broken line or a dotted line, for example. Alternatively, four corners of the image-areas may be indicated by spots, or two line segments perpendicular to each other.

The width ($W_t$) of the indications extending in the direction of the film's width is preferred to be not less than $\Delta D_t/2$. More specifically, the width $W_t$ is preferably not more than 1 mm, more preferably not more than 0.8 mm, and most preferably not more than 0.6 mm but not less than 0.4 mm.

The difference ($\Delta D_L$ hereinafter), when viewed in the film's lengthwise direction, between the indications and the length of the image-area is preferably not more than 2 mm, more preferably not more than 1.5 mm, and most preferably not more than 1.2 mm, but not less than 1.0 mm.

The width ($W_L$) of the indications extending in the direction of the film's length is preferred to be not less than $\Delta D_L/2$. More specifically, the width $W_L$ is preferably not more than 2 mm, more preferably not more than 1.5 mm, and most preferably not more than 1.2 mm, but not less than 0.8 mm.

An area between adjacent image-areas in the direction of the film's length may be full of lines, where the width $W_L$ is made equal to the half of the interval between the adjacent image-areas in the direction of the film's length.

A value X is preferably not less than 1.2 but not more than 3.0, more preferably not less than 1.5 but not more than 2.5, where X is denoted as in the equation below.

$$X = \Delta D_L/\Delta D_t$$

The indications composed of latent images recorded on a film by exposure in a film-producing stage can be made visual through developing.

At least one of the differences in density between the indications and the photographic fog in a developed film, which differences are measured through a red filter, a green filter or a blue filter (each differences is called $\Delta D_R$, $\Delta D_G$, $\Delta D_B$ respectively hereinafter), is preferably not less than 0.3, more preferably not less than 0.5, and most preferably not less than 0.8, but not more than 1.5. When the differences are arranged within the aforementioned range, the indications can be well distinguished from the image-areas.

As aforementioned, when an optical data-recording means that makes use of photographic sensitivity is used to record data into a data-recording portion of a film, the data-recording portion is preferably located outside the image-areas in the direction of the film's width, which image-areas are surrounded with the indications.

As aforementioned, the number of perforations is preferably decreased in order to enlarge an area of the data-recording portions. The number of perforations per image-area is preferably not more than four, more preferably not more than two.

The ratio of an area of a data-recording portion relative to an area of an image-area is preferably not less than 15 percent, more preferably not less than 25 percent, and most preferably not less than 30 percent, but not more than 45 percent.

In this specification, the aforementioned ratio is defined as follows.

As shown in FIG. 6, a film 1 is provided with image-areas 30 surrounded by lines 3a and 3b, lines 3a extending in the direction of the film's width for indicating the locations of the image-areas 30, and lines 3b extending in the direction of the film's length for indicating the locations of the image-areas 30 and optical data-recording portions 31a and 31b located outside the image-areas 30 in the direction of the film's width. Provided that the film 1 has a width represented by "A", an interval on the inside between the lines 3b is represented by "C" which is equal to a width of the image-areas 30, and provided that each of the lines 3b has width represented by "$D_1$" and "$D_2$", the ratio R of the area of the total of the data-recording portions 31a and 31b relative to the area of the image-area 30 is defined by the following equation:

$$R = (A - C - D_1 - D_2)/A \times 100$$
$$= (E_1 + E_2)/A \times 100(\%);$$

where $E_1$ and $E_2$ represent a width of the data-recording portions 4a and 4b respectively.

As described in detail later, though the data-recording portions 31a and 31b in a currently available roll film can have, at most, widths $E_1$ and $E_2$ of 2 mm long respectively, the arrangement as shown in FIG. 6 can elongate the width $E_1$ and $E_2$ of the data-recording portions 31a and 31b to within the range of 3 mm to 8 mm.

As aforementioned, a light-tight type cartridge as disclosed in Japanese Utility Model Application No. 1-17253 is preferably used to prevent data which have been input onto a film from being eliminated because of photographic fog. Data provided from a camera is preferably recorded in a portion of the film protected from the photgraphic fog.

Inputting data to a film by means of the optical data-recording means can be achieved at any time, preferably in a film-producing stage or at the taking of photographs.

Only an optical data-recording means may be used to input various data into a film, however, at least one of a magnetic means, an electric means, a printing means and a mechanical means is preferably used together with the optical data-recording means.

A semiconductor element may be used as the electric means, in particular an EEPROM is a preferred semiconductor. The semiconductor element is preferably attached to the cartridge, alternatively, the cartridge and the semiconductor element may be separately mounted on a camera. The electric data-recording means includes an IC card having a microcomputer and an EEPROM.

A transparent magnetic base disclosed in U.S. Pat. Nos. 4,302,523, 3,782,947 and 4,279,945 is preferably used as the magnetic data-recording means. This transparent magnetic base has two advantages. One advantage is that data about a specific image-area can be input into an area adjacent to that image-area; the other advantage is that an optical data-recording portion can be used as a magnetic data-recording portion. The magnetic data-recording portion may be formed only outside the image-areas. In this arrangement, the magnetic data-recording portion may be opaque.

In a cartridge provided with the magnetic data-recording means, data regarding the DX code and the state of a film can be input into or output from this magnetic data-recording means. This arrangement brings an advantage in that the data regarding comsumption status of a film input in the cartridge can be confirmed without taking the film out of a camera. There are many ways to provide a cartridge with the magnetic data-recording means: for instance, attaching a magnetic tape to a cartridge, manufacturing a cartridge from a polymer with magnetic material distributed therein to provide the cartridge with magnetically data-record function, and printing a cartridge with an ink having magnetic material distributed therein.

The possible ways of printing include an ink-jet method, and marking by a punching means in a mechanical sense.

The image-areas have areas preferably within the range of 350 mm² to 1200 mm². The film width A is preferably within the range of 20 mm to 40 mm.

The line 3a for indicating the location of the image-areas contains an area between the adjacent image-areas in the direction of the film's length. The lines 3a and 3b are made visual after being developed as shown in FIG. 6.

DESCRIPTION OF THE PREFERRED EMBODIMENTS

Figure 1:
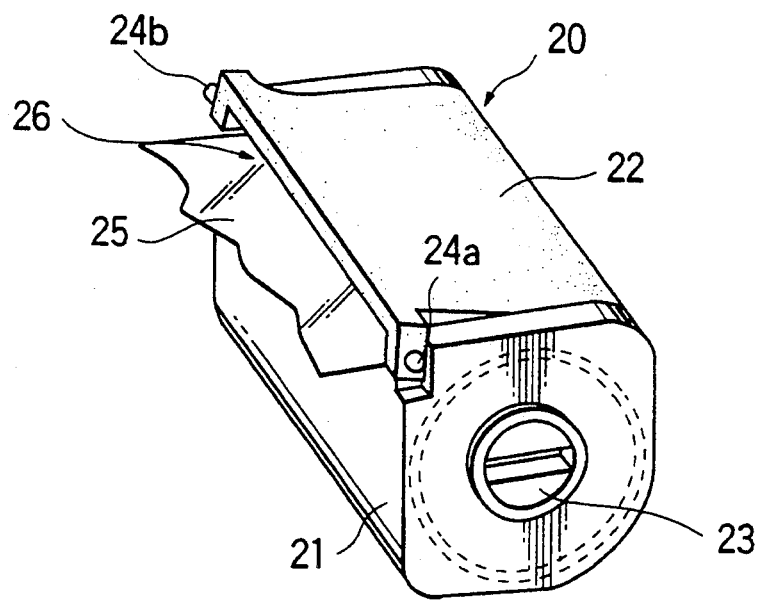
FIG. 1 is a perspective view of a photographic film product in accordance with the present invention.

FIG. 1 illustrates a photographic film cartridge that is applied to the present invention. The film cartridge 20 includes a cartridge body 21, a flexible wall portion 22 connected at one end to the cartridge body 21, and a spool 23 carried in the cartridge body 21 for rotation about a longitudinal axis thereof. The flexible wall portion 22 has a pair of projections 24a and 24b provided at opposite ends thereof for engaging to an engaging mechanism of a camera. A film 25 is tightly wound into a roll around the spool 23, and is housed in the cartridge body 21. The whole of the film cartridge 20 is a light-tight type. In this embodiment, a film available under designation "FUJI COLOR SHG400" is used as the film 25.

The film cartridge 20 operates as follows

When the film cartridge 20 is loaded into a camera, the cover-opening mechanism of a camera (not shown) engages the pair of projections 24a and 24b to lift them up. Since the cartridge 20 is fixedly loaded in the camera, when the projections 24a and 24b are lifted upward, the flexible wall portion 22 is deformed upwardly to form an inlet opening 26, as shown in FIG. 1. Then, the spool 23 is made to rotate in the unwinding direction, namely, in the couterclockwise direction with respect to FIG. 1. Since the film 25 is tightly wound around the spool 23, the film 25 is made to feed out through the inlet opening 26 and led to an exposure station in the camera.

Figure 2:
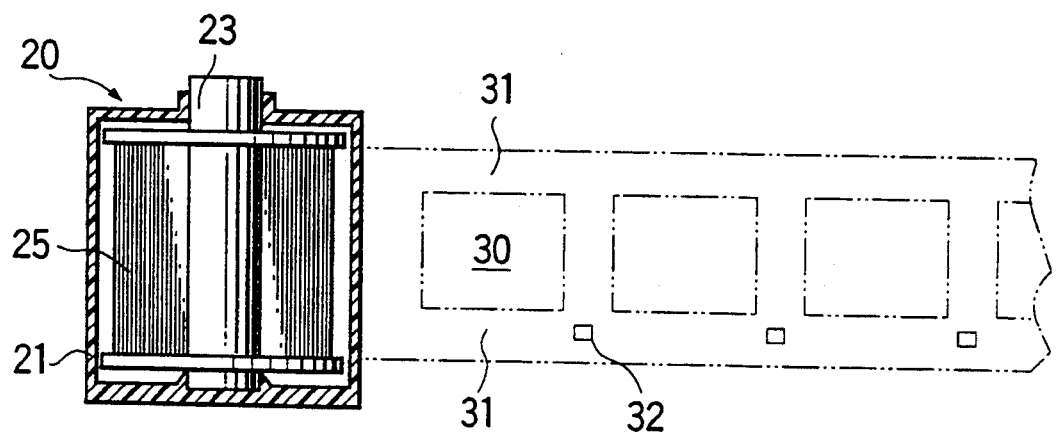
FIG. 2 is a schematic view of the photographic film product of FIG. 1 with a film fed out of a cartridge.

FIG. 2 illustrates a first embodiment of the film 25, wherein the film 25 is fed out of the film cartridge 20. The film 25 has a plurality of image-areas 30 arranged in the direction of the film's length, portions 31 of the film 25 into which various data is recorded optically, and perforations 32 for locating the image-areas 30 in appropriate positions. The optical data-recording portions 31 are located outside the image-areas 30 in the direction of the film's width or at the longitudinal edges of the film 25, and utilize the photographic sensitivity of the film 25 to input and record various data thereto.

Figure 3:
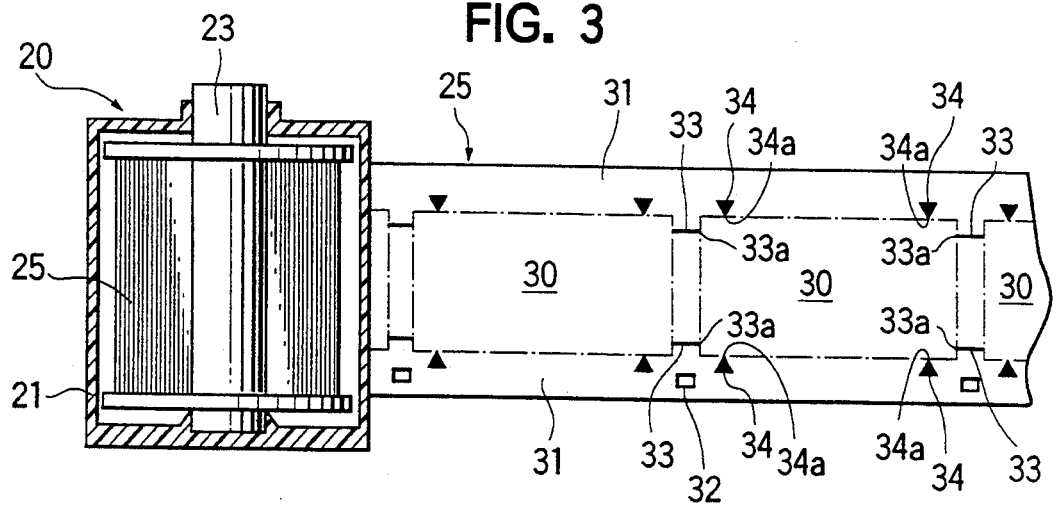
FIG. 3 is a schematic view of the photographic film product of FIG. 1 with a film fed out of a cartridge, wherein the film is of different type from that in FIG. 2.

FIG. 3 illustrates a second embodiment of the film 25. The film 25 has a plurality of image-areas 30 arranged in the direction of the film's length, optical data-recording portions 31, perforations 32 for locating the image-areas 30 in appropriate positions, and marks 33 and 34 for indicating opposite ends of the image-areas 30 the size of which varies in accordance with different aspect ratios.

The mark 33 is composed of lines extending in the direction of the film's length between the adjacent image-areas 30. An area surrounded by four points 33a, on which the marks 33 and the image-areas 30 intersect, forms an image-area for high aspect ratio. On the other hand, the marks 34 are composed of triangles, and located on the periphery of the image-areas 30. Four apexes 34a of the marks 34 define an area for low aspect ratio.

The marks 33 and 34 are to be printed in a film-producing stage and are made visual when a film is developed.

Figure 4:
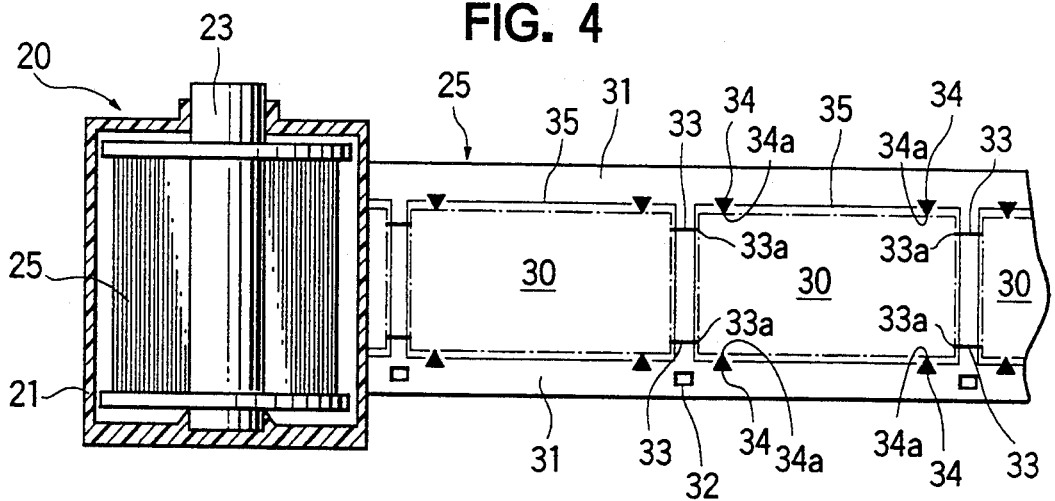
FIG. 4 is a schematic view of the photographic film product of FIG. 1 with a film fed out of a cartridge, wherein the film is of different type from those in FIGS. 2 and 3.

FIG. 4 illustrates a third embodiment of the film 25. The film 25 further has marks 35 for indicating the periphery of the image-areas 30, in addition to the structure of the second embodiment of the film shown in FIG. 3. The marks 35 extend on the periphery of the image-areas 30 and surround an area coextensive with the image-areas 30. The marks 35 are composed of continual lines having the width 0.1 mm. As aforementioned, the marks 35 may be formed in uncontinual lines, such as broken lines or dotted lines.

Figure 5:
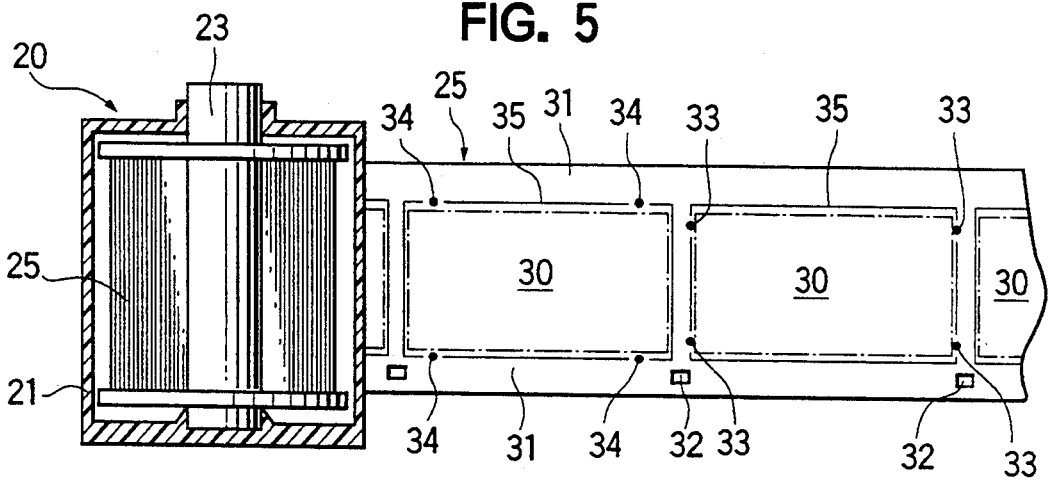
FIG. 5 is a schematic view of the photographic film product of FIG. 1 with a film fed out of a cartridge, wherein the film is of different type from those in FIGS. 2, 3 and 4.
Figure 6:
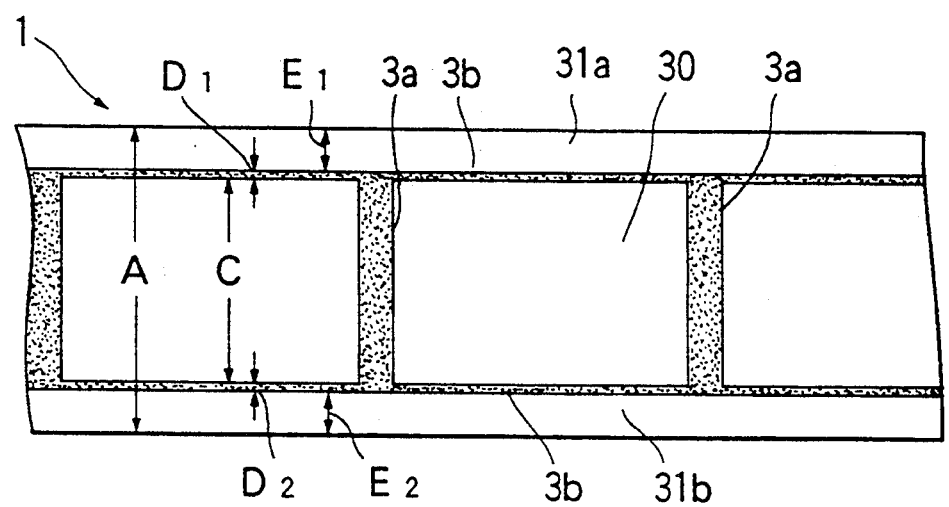
FIG. 6 is a plan view of the film showing the relationship between indications and image-areas.

In FIG. 5, the film 25 has the same structure as that of FIG. 4 except that both the marks 33 and 34 are formed as circular points.

The marks 33, 34, 35 shown in FIG. 4 are printed when a film is produced, whereas the marks 35 in FIG. 5 are printed when a film is produced and the marks 33 and 34 in FIG. 5 are printed when photographs are taken. The marks 33, 34, 35 in FIGS. 4 and 5 are made visual when a film is developed.

An experiment was performed to determine the advantageous effects of the film cartridge 20. In this experiment a camera, modified as described below, is used with the cartridge 20 loaded therein.

Observations are as follows below

1. The aspect ratio of the image-areas is changed to 1.79. The image-areas are of the size 36 mm × 20 mm.

2. Two LED (light emitting diodes) are provided outside the image-areas to input aspect ratio-concerning data into a film.

3. A cartridge-loading room in a camera is modified to load the cartridge 20 shown in FIG. 1 thereto.

4. A view finder is provided with lines defining image-areas having aspect-ratios 1.46, 1.79 and 2.85.

These three different aspect ratios correspond to the number of input LED signals as follows.

| Number of LED signals | Aspect ratio |
|---|---|
| 0 | 1.46 |
| 1 | 1.79 |
| 2 | 2.85 |

Three photographs were printed, each having the aforementioned three aspect ratios in accordance with LED signals. The widths of the three photographs were 89 mm. The aspect ratio was varied by changing the length of the photographs.

This experiment showed that photographs having three different aspect ratios and having high image-quality could be obtained.

In addition, the relationship between image-areas in negatives and image-areas in printed photographs is easily understood since the location and the opposite ends of the image-areas are indicated by the marks 33, 34, 35.

It should be noted that in this experiment negative image-areas having an aspect ratio of 1.79 were first made independently of aspect ratios instructed by a photographer, and the aspect ratios of photographs were arranged so that they could be changed at a secondary printing.

Figure 7:
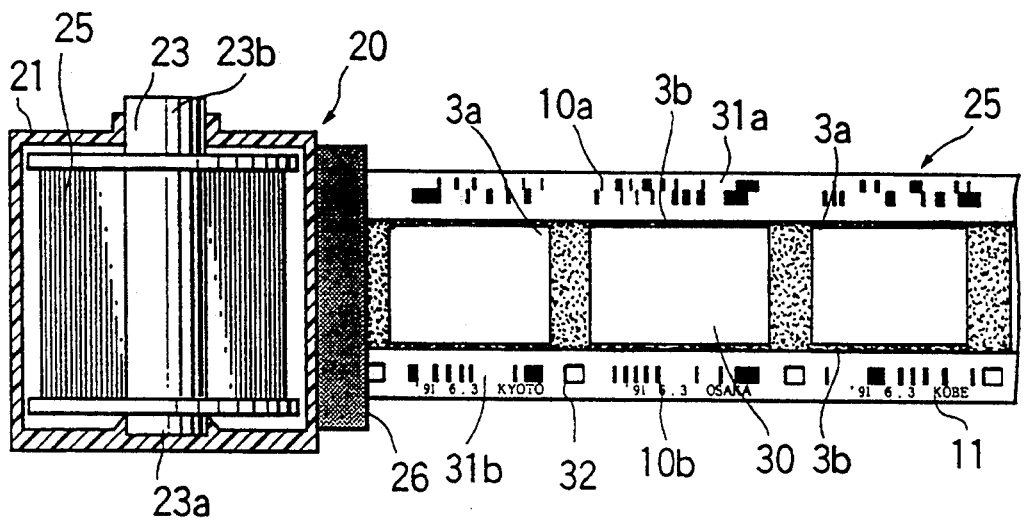
FIG. 7 is a schematic view of the photographic film product of FIG. 1 with a flim fed out of a cartridge, wherein the film is of different type from those in FIGS. 2, 3, 4 and 5.
Figure 8:
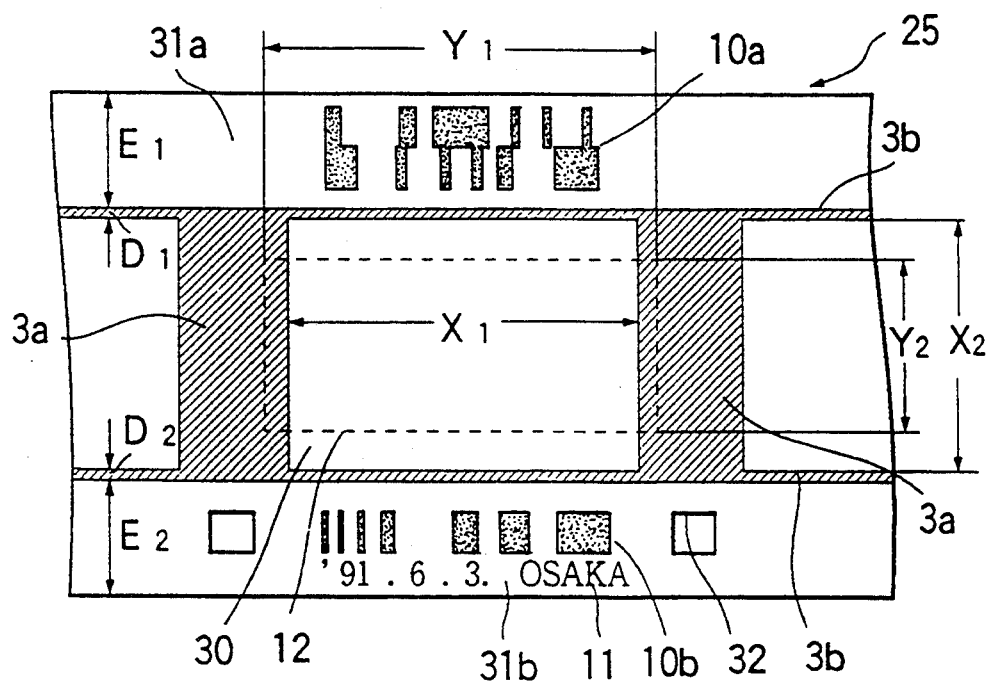
FIG. 8 is an enlarged plan view showing the positional relationship between the lines for indicating the location of image-areas and the image-areas.

FIGS. 7 and 8 illustrate another embodiment of the film 25. The film 25 has a base having thickness 122μ. This base is a cellulose triacetate base, on the surface of which is formed a sensitive layer for a color negative film having sensitivity designation of 400, which layer contains silver in the rate of 7 grams per square meter (See Japanese Patent Public Disclosure No. 63-236035).

FIG. 7 illustrates a film 25 housed in a film cartridge 20 having a cartridge body 21 and a spool 23. The spool 23 is carried at one end 23a thereof in the cartridge body 21 for rotation about a longitudinal axis of the spool 23. The opposite end 23b of the spool 23 projects out of the cartridge body 21, and is carried so that the rotation of the end 23b causes rotation of the spool 23. The film 25 is wound into a roll around the spool 23, is housed in the cartridge body 21, and is succesively fed out of the cartridge body 21 through an inlet opening 26. It should be noted that a cartridge in which a film in accordance with the invention is housed is not limited to this type of cartridge, and that any type of cartridge may be used.

Similarly to the film 25 shown in FIGS. 3, 4 and 5, the film 25 in FIG. 7 has image-areas 30 arranged in the direction of the film's length, optical data-recording portions 31a and 31b that make use of photosensitivity, lines 3a extending in the direction of the film's width for indicating the location of the image-areas 30, lines 3b extending in the direction of the film's length for indicating the location of the image-areas 30, and one perforation 32 per image-area 30.

As can be seen in FIG. 8, a picture plane 12 is arranged by an exposure aperture of a camera for each of image-areas 30. The picture plane 12 is defined by a rectangular area surrounded by broken lines. Images are input in an overlaping area between the image-areas 30 and the picture planes 12. The intervals $X_1$ between the lines 3a on the inside of the picture planes 12 are arranged to be shorter than the lengths $Y_1$ of the picture planes 12 in the direction of the film's length, whereas the intervals $X_2$ between the lines 3b is arranged to be longer than the lengths $Y_2$ of the picture planes 12 in the direction of the film's width.

The lines 3a between the adjacent image-areas 30 are made visual through developing.

The difference in density between the lines and photographic fog portions is 0.8 in each of a red filter, a green filter and a blue filter of status M.

The line 3a has width 1 mm and the line 3b has width 0.5 mm. The difference $\Delta D_L$ between the lengths $Y_1$ of the picture planes; and the intervals $X_1$ is 2 mm, and the difference $\Delta D_t$ between the intervals $X_2$ and the widths $Y_2$ of the picture planes 12 is 1 mm.

$$\Delta D_L = Y_1 - X_1 = 2 \text{ mm}$$

$$\Delta D_t = X_2 - Y_2 = 2 \text{ mm}$$

The width of the film 25 and the widths of the picture planes 12 are made to be the same as those of currently available roll films; in order to compare the film 25 to the latter. Namely, the width of the film 25 is 35 mm and the width $Y_2$ of the picture plane 12 is 24 mm. Accordingly, this arrangement makes the width of each optical data-recording portions 31a and 31b to be 5 mm, and thus the aforementioned ratio R is calculated, based on the following equation, to be about 26 percent.

$$R = (35 - 24 - 1 - 1)/35 \times 100 = 25.7\%$$

A currently available roll-type film is provided with perforations at longitudinal edges thereof. Such perforations need, each, an area of 3.5 mm width. Accordingly, as is clear from the following calculation, the optical data-recording area has merely 2 mm width outside the perforations at both longitudinal edges of a film. In a currently available roll-type film, various data such as the DX code are recorded in these 2 mm wide areas.

$$(35 - 24 - 3.5 \times 2)/2 = 2 \text{ mm}$$

Thus, a currently available roll-type film has a ratio T of the area of the optical data-recording portions relative to that of the image-areas.

$$T = (35 - 24 - 7)/35 \times 100 = 11.4\% < R = 25.7\%$$

Thus, the film 25 can provide larger area of the optical data-recording portions than a currently available roll-type film, and accordingly, two rows of bar codes or letters can be formed on the optical data-recording portions 31a and 31b in the direction of the film's length. For instance, as shown in FIGS. 7 and 8, the optical data-recording portion 31a having no perforations 32 can be provided with two rows of bar codes 10a in the direction of the film's length. On the other hand, the optical data-recording portion 31b that has the perforations 32 can be provided with one row of bar codes 10b and one row of letters 11. These rows 10a, 10b, 11 are made visual as shown in FIGS. 7 and 8 through developing.

As aforementioned, both the optical data-recording portions 31a and 31b can be provided with two rows of data, which results in that various data regarding the photographing being recorded onto the film 25. It should be noted that images are not recorded onto the data-recording portions 31a and 31b.

In this embodiment, the optical data-recording portion 31b was used for a photographer to record photograph-concerning data provided from a camera, while the optical data-recording portion 31a was used for a film manufacturer to record data such as the kind of photographic film, image-areas numbers, a film lot number and the like. Red LEDs were used to record photograph-concerning data provided from a camera.

Figure 9:
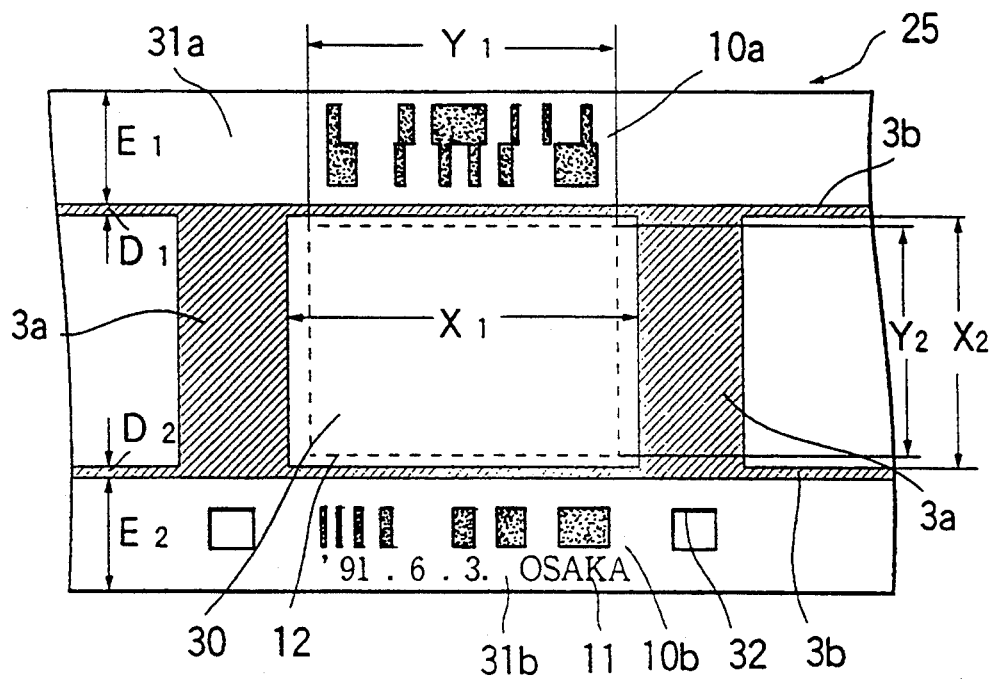
FIG. 9 is an enlarged plan view showing an other positional relationship between the lines for indicating the location of image-areas and the image-areas.

FIG. 9 illustrates another embodiment of the film 25. In this embodiment, the intervals $X_1$ between the lines 3a are arranged to be longer than the lengths $Y_1$ of the picture planes 12. The difference $\Delta D_L$ between $X_1$ and $Y_1$ is 2 mm.

$$\Delta D_L = X_1 - Y_1 = 2 \text{ mm}$$

The film 25 in this embodiment has the same elements as that shown in FIG. 8 excepting the aforementioned difference. Accordingly, this embodiment can also provide the same ratio R as the previous embodiment, with the same result that various kinds of data can be input onto the data-recording portions 31a and 31b.

As described so far with respect to the preferred embodiments, the photographic film product according to the present invention can provide at least three different aspect ratios, and improve the image-quality of panoramic prints. In addition, the relationship between image-areas of negative prints and image-areas of developed prints is made easy to check if an exposure aperture of a camera has no variable mask-mechanism that is able to be adjusted in accordance with different aspect ratios.

Furthermore, the photographic film product in accordance with the present invention arranges the difference, as viewed in the direction of the film's length, between the film's widthwise extending indications and the length of the image-areas to be larger than the difference, as viewed in the direction of the film's width, between the film's lengthwise-extending indications and the width of the image-areas, such that the total area of the optical data-recording portions is increased with the result that various kinds of data can be recorded onto the film.

While the present invention has been described with respect to the preferred embodiments, it will be understood that it is not intended to limit the invention to these embodiments, but it is intended that the present invention cover all alternatives, modifications, and equivalents as may be included within the spirit and scope of the invention as defined by the attached claims.

What is claimed is:

1. A photographic film product comprising:
    a roll of film; and
    indications formed at positions which define a location of image-areas on said film;
    wherein said indications extend in both a lengthwise and widthwise direction of said film along a periphery of said image-areas, and said indications are capable of being made visual by developing said film;
    said film includes a data-recording portion formed outside said image-areas in the widthwise direction of said film;
    a first distance defined between said indications and extending in the widthwise direction of said film and a second distance defined as a length of said image-areas as measured in the lengthwise direction of said film, a third distance defined as a distance between said indications extending in the lengthwise direction of said film and a fourth distance defined as a width of said image-areas as measured in the widthwise direction of said film;

a first difference between said first distance and said second distance being larger than a second difference between said third distance and said fourth distance.

2. A photographic film product comprising:
a cartridge;
a spool carried in said cartridge for rotation about a longitudinal axis of said spool;
a film wound into a roll around said spool capable of recording an image with an image-area having a varying aspect ratio; and
recording means for recording on the film information about a desired aspect ratio of the image-area, said recording means being provided on at least one of said film and said cartridge,
wherein a plurality of marks are printed on said film during one of film production and photography, such that a periphery of the image-area can be defined by connecting a subset of marks selected from said plurality of marks, where the subset of marks are selected based on the desired aspect ratio of the image to be recorded indicated by the film information.

3. A photographic film product comprising:
a cartridge;
a spool carried in said cartridge for rotation about a longitudinal axis of said spool;
a film wound into a roll around said spool, wherein said film has image areas not smaller than 350 square millimeters but not larger than 1200 square millimeters, and said image areas are capable of recording an image having an aspect ratio in a range of 1.70 to 1.90;
marks formed on portions of said film which are outside the image area, during production of film or during photographing, said marks being placed at positions which correspond to opposite upper and lower edges of the image areas, the sizes of the image areas varying in accordance with different aspect ratios; and
recording means for recording on said film information about the aspect ratio of the image recorded on the image areas, said recording means being provided on at least one of said film and said cartridge.

4. A photographic film product comprising:
a cartridge;
a spool carried in said cartridge for rotation about a longitudinal axis of said spool;
a film wound into a roll around said spool, wherein said film has image areas not smaller than 350 square millimeters but not larger than 1200 square millimeters, and said image areas are capable of recording an image having an aspect ratio in a range of 1.70 to 1.90;
first marks printed on said film, during production of said film, at positions which correspond to a periphery of the image areas;
second marks formed on said film, during a photographing process, at positions which correspond to opposite upper and lower edges of said image areas, the sizes of said image areas varying in accordance with different aspect ratios; and
recording means for recording on said film information about the aspect ratio of the images recorded on the image areas, said recording means being provided on at least one of said film and said cartridge.

5. A photographic film product comprising:
a cartridge;
a spool carried in said cartridge for rotation about a longitudinal axis of said spool;
a film wound into a roll around said spool, wherein said film has image areas not smaller than 350 square millimeters but not larger than 1200 square millimeters, and said image areas are capable of recording an image having an aspect ratio in a range of 1.70 to 1.90;
first marks printed on said film, during a photographing process, at positions which correspond to a periphery of the image areas;
second marks formed on said film, during a photographing process, at positions which correspond to opposite upper and lower edges of said image areas, the sizes of said image areas varying in accordance with different aspect ratios; and
recording means for recording on said film information about the aspect ratio of the images recorded on the image areas, said recording means being provided on at least one of said film and said cartridge.

6. A photographic film product comprising:
a cartridge;
a spool carried in said cartridge for rotation about a longitudinal axis of said spool;
a film wound into a roll around said spool, wherein said film has image areas not smaller than 350 square millimeters but not larger than 1200 millimeters, and said image areas are capable of recording an image having an aspect ratio in a range of 1.70 to 1.90;
first marks printed on said film, during production of said film or during photographing, at positions which correspond to a periphery of the image areas;
second marks formed on said film, during a photographing process, at positions which correspond to opposite upper and lower edges of said image areas, the sizes of said image areas varying in accordance with different aspect ratio of the images recorded on the image areas and recording means for recording on said film information about the aspect ratio of the images recorded on the image areas, said recording means being provided on at least one of said film and said cartridge.

* * * * *